Nov. 29, 1949     H. E. MYERS     2,489,719
BORING HEAD WITH FACING FEED
Filed Jan. 13, 1947     2 Sheets-Sheet 1
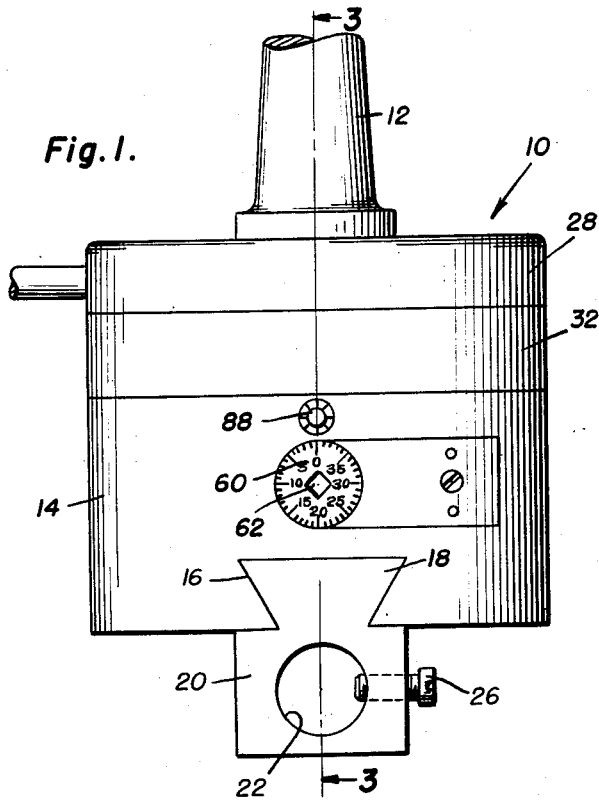
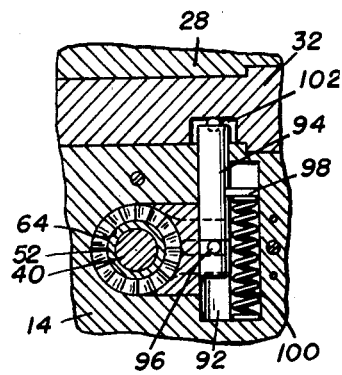
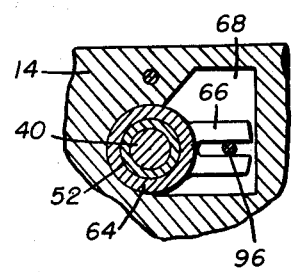
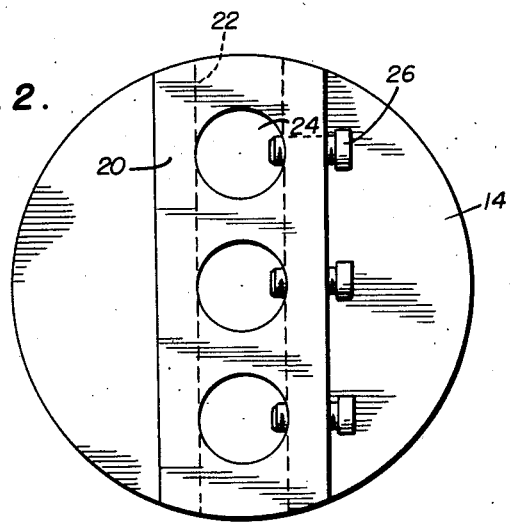
Inventor
Herman E. Myers
By *Clarence A. O'Brien and Harvey B. Jacobson*
Attorneys

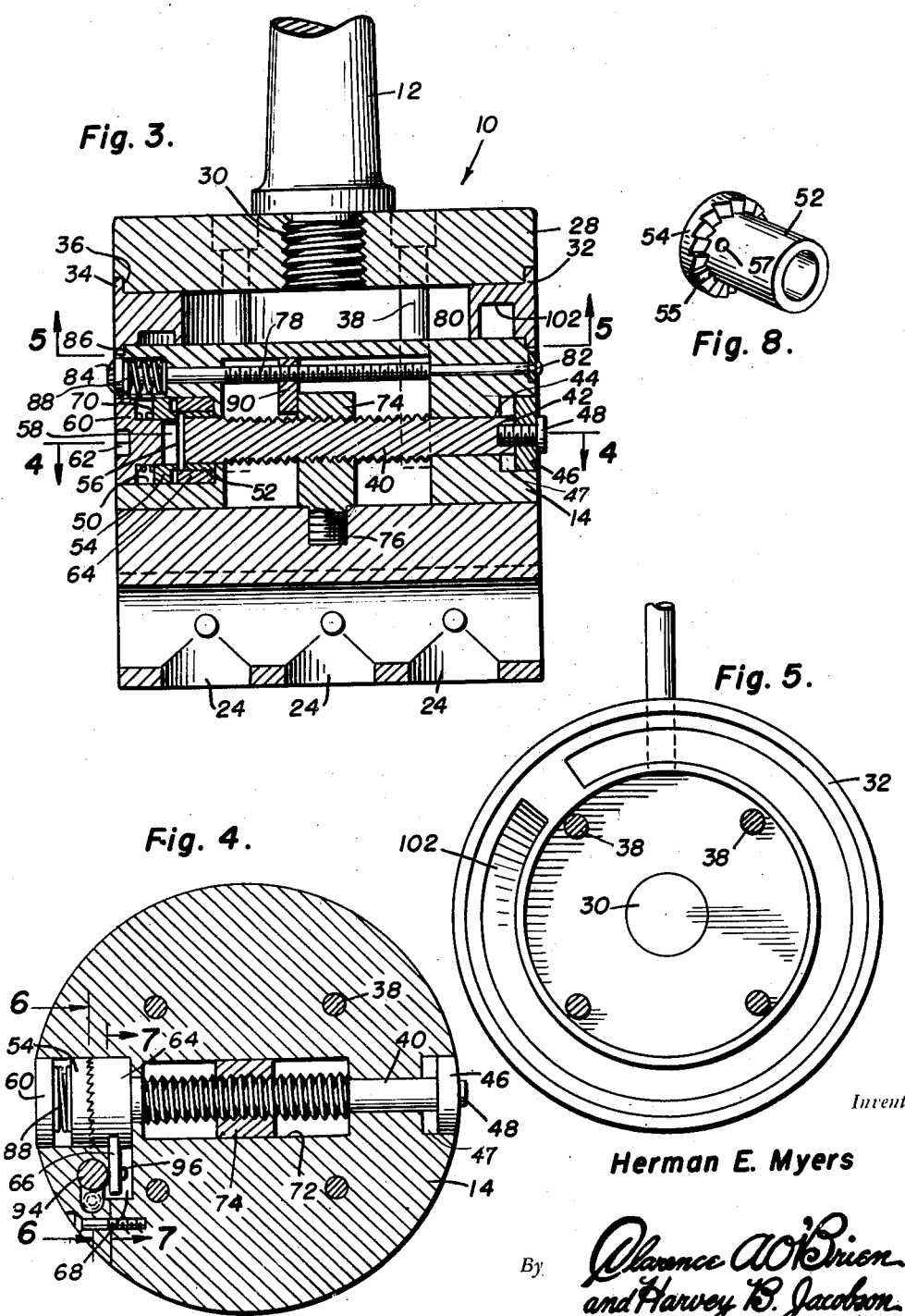

Patented Nov. 29, 1949

2,489,719

UNITED STATES PATENT OFFICE 2,489,719

BORING HEAD WITH FACING FEED

Herman E. Myers, Milwaukee, Wis.

Application January 13, 1947, Serial No. 721,839

7 Claims. (Cl. 77—58)

This invention relates to novel and useful improvements in a boring head with facing feed, and more specifically pertains to a boring and facing head adapted for rotation in a suitable tool, and provided with highly efficient and extremely precise control means for laterally adjusting the tool holder relative to the boring head.

The principal objects of the present invention reside in providing a boring and facing head having means for laterally adjusting the tool holder thereof; for providing an easily operating means for approximately adjusting the tool holder relative to the work; for providing a highly efficient limiting means for stopping the actuation of the adjusting means when desired; in providing an extremely precise and micrometric control means for effecting precision adjustment of the adjusting means; in providing a device wherein the foregoing objects are attained by mechanism completely enclosed within the boring head; and wherein a compact, extremely accurate and easily adjusted and highly efficient device is provided for the purposes intended.

These, together with various ancillary objects of the invention which will later become apparent as the following description proceeds, are realized by this invention, one embodiment of which has been illustrated by way of example only in the accompanying drawings, wherein:

Figure 1 is a front elevational view of the novel apparatus;

Figure 2 is a lower plan view of Figure 1;

Figure 3 is a vertical frontal sectional view being taken substantially on the section line 3—3 of Figure 1;

Figure 4 is a horizontal sectional view being taken substantially upon the line 4—4 of Figure 3;

Figure 5 is a horizontal sectional view being taken substantially upon the line 5—5 of Figure 3;

Figure 6 is a fragmentary enlarged detailed view being taken in section upon the line 6—6 of Figure 4;

Figure 7 is a fragmentary detail view being taken in section substantially upon the line 7—7 of Figure 4; and Figure 8 is a perspective view of a clutch member forming part of the control of the adjusting means.

Referring now more specifically to the accompanying drawings, wherein like numerals indicate similar parts throughout the various views, numeral 10 designates generally the improved boring head forming the subject of this invention and which is shown as detachably provided with a tapered spindle 12 for detachably connecting the boring head with any desired machine in accordance with conventional practice.

As shown more clearly in Figures 1 and 3, the boring head 10 is provided with a block or body portion 14, preferably cylindrical in shape, and which is provided at its lower portion with a diametrically extending dove-tailed guide slot 16 within which is laterally slidable a similarly shaped guide member 18 integrally formed upon the depending tool carrier block portion 20, for securing the tool carrier to the lower surface of the block 14 for laterally adjustable movement relative thereto in a matter to be subsequently described. The tool carrier 20 is preferably formed with a longitudinally extending cylindrical bore 22 extending from end to end thereof, which bore is intersected by downwardly extending apertures or sockets 24 adapted to accommodate various types of tool bits for individual or combined tooling operations. By means of suitable set screws 26, the various tool bits, not shown, may be retained in the bores 24 or 22 as desired.

The boring head 10 further includes a head piece 28, removably secured upon the arbor 12 as by means of the screw threaded engagement 30 shown in Figure 3. Between the head plate 28 and the block or body portion 14, is provided a rotatable annulus 32 which constitutes a spacing means between the head plate and the block, and which is retained in position between the adjacent members by means of laterally extending peripheral flanges 34 slidably engaged in suitable shouldered recesses 36 disposed circumferentially upon the members 28 and 14. The elements 28, 32 and 14 are preferably contoured to form in their entirety, a cylindrical boring head, and are retained in assembled position as by means of fastening bolts 38 suitably recessed in the head member 28 and extending therethrough and into the block 14. The arrangement is such that rotation of the arbor 12 will cause rotation of the head plate 28 and by means of the screw 38 corresponding rotation as a unit therewith, of the block portion 14 and the tool carrier 20. The annulus 32 is preferably concentrically retained between the head plate 28 and the block 14, in such manner that it may be separately rotated to effect an adjustment of the tool holder 20 in a manner to be subsequently set forth.

As shown best in Figure 3, the interior of the boring head 10 is hollow, for the purpose of housing the adjusting mechanism of the tool carrier to be now described. Extending diametrically of the body portion 14, and disposed parallel to and above the tool holder 20, is an adjusting means consisting of a lead screw 40, having an end portion 42 of reduced diameter rotatably received in a journal 44 formed in the walls of the block 14, and retained therein by means of a washer 46 and a fastening screw 48. The other end of the lead screw 40 extends into a bore 50 and has secured thereto a clutch bushing 52 having an enlarged flange 54 constituting a clutch head which is provided with axially extending clutch teeth 55. The clutch sleeve 52 is retained upon the lead screw 40 by means of a pin 56 extending through suitable apertures 57 in the circumference of the sleeve 52, and also loosely extending through the elongated slot 58 formed through that portion of the lead screw 40 which extends into the bore 50. As shown at 60, the outer end of the lead screw 40 is headed to constitute a closure member received in the end of the bore 50, and is provided with a squared recess or bore 62 upon its outer surface for the engagement of a correspondingly shaped end of an adjusting tool for a purpose to be later set forth. Journalled upon a bushing 52, is a second sleeve or bushing 64 which opposite the clutch teeth 54 is provided with similar teeth for engagement therewith. This second clutch bushing, as shown in Figures 4 and 7, is provided with a laterally extending and bifurcated projection 66 which is disposed in a suitably positioned and proportioned recess 68 in the block 14. A coil spring 70 is provided between the clutch flange 54 and the headed portion 60 of the lead screw 40, for the purpose of urging the clutch inwardly into engagement with the sleeve member 64 for a purpose to be later set forth. As shown best in Figure 4, the block 14 is provided with a guiding slot 72 extending diametrically thereof, and constituting a guideway for a traveling nut 74 which screw threadedly engages the lead screw 40 and is detachably secured as at 76 to the retaining portion 18 of the tool carrier 20. As will therefore be evident, from the device as thusfar described, suitable rotation of the lead screw 40 by means of a tool inserted in the recess 62, causes lateral travel of the traveling nut 74 within the guiding slot 72, and causes corresponding lateral shifting of the tool carrier 20 and the tools attached thereto.

Attention is next directed to the adjustment limiting means and for a clear description thereof reference is now made to Figure 3. Disposed parallel to the lead screw 40, and journalled in the block 14 slightly thereabove, is a second lead screw 78 which is disposed diametrically of the block 14 and has a reduced end portion 80 journalled in a corresponding bore in the block and retained therein as by a washer and fastening means indicated generally at 82. At its other end, the limiting lead screw 78 is provided with a headed portion 84 which is received within an enlarged bore 86 and which is provided with a coil spring 88 for biasing the lead screw fixedly in one direction for the purpose of picking up any lost motion in its journals. Suitably guided in the above mentioned guiding slot 72, is a stop member 90 having screw threaded engagement with the second lead screw 78 and having a projection extending into the path of travel of the traveling nut 74. As will readily be seen, proper manipulation of the second lead screw 78 will position the stop 90 in a predetermined location, to thereby limit the lateral shifting of the traveling nut 74 by rotation of the lead screw 40, and the subsequent lateral displacement of the tool carrier 20.

Reference is now made again to the control sleeve 64 and its bifurcated extensions 66, as shown best in Figures 4, 6 and 7. Communicating with the recess 68 and disposed adjacent the extension 66, is a cylindrical bore 92 within which is slidably and reciprocatably mounted a plunger 94 having a laterally extending pin 96 pivotally engaged in the bifurcations of the member 66. Extending laterally from the plunger 94 is a projection 98 constituting a seat for a resilient spring 100 which yieldingly urges the plunger 94 upwardly of the bore 92 and causes the continual engagement of its upper end with a circular cam track 102 formed upon the lower surface of the adjusting annulus 32. It will thus be apparent that as annulus 32 is rotated upon the longitudinal axis of the tool 10, the cam track 102 causes an adjustable reciprocation of the plunger 94, and by means of the pin 96 in the bifurcations 66, results in an oscillation of the clutch sleeve 64 and by means of the clutch teeth 55 and clutch member 52, produces a predetermined and proportioned rotation of the lead screw 40 with a resultant lateral travel of the traveling nut 74 and lateral adjustment of the tool carrier 20.

As will be readily understood, the adjusting lead screw 40 and the limiting lead screw 78 will preferably be provided with threads of a predetermined pitch, and suitable indicia will be provided upon the headed portion 60 and 84 of the respective lead screws, whereby by proper calibration of the screw threads and proportioning of the various parts, an exact and precise predetermined lateral movement may be imparted to the tool carrier 20, to cause the desired penetration of the tool into the work.

The manner of employing the improved boring and facing head is as follows. With the arbor 12 mounted in any suitable machine, for rotation thereby, and suitable tools mounted in the apertures 24 or in the bore 22, the lead screw 40 is adjusted manually by means of a tool engaged in the adjusting socket 62, to position the tool elements upon the surface of the work. Proper manipulation of the adjusting knob 84 causes the limiting lead screw 78 to position the stop member 90 at the appropriate stop to limit the penetration of the tools by reason of the lateral movement of the traveling nut 74. Now, as the work or tool head or both are rotated, manual adjustment of the annulus 32 may be readily effected to cause the cam track 102 to depress the plunger 94 and through the pin 96 and bifurcations 66, cause rotation of the clutch sleeve 64 and 52 to effect a predetermined rotation of the lead screw 40 with a resultant travel of the nut 74 and tool holder 20.

In order to cause retraction of the traveling nut 74, the lead screw 40 is moved manually and diametrically of the block 14, so that the washer 46 will be received in the recess 47. This movement of the lead screw will urge the clutch plate 54 out of clutching engagement with the clutch plate 64 to permit a manual rotation of the lead screw through a tool inserted in the recess or bore 62, it being understood that an inward radial pressure will be applied to the washer 46 at all times during the rotation of the lead screw for retracting the travelling nut 74.

By the foregoing, a rough and approximate adjustment of the tool to be worked can be readily obtained and then with great ease during the actual cutting operation, the manual adjustment to the exact extent required may be effected by manipulation of the annulus 32.

Since various embodiments and modifications will be readily apparent to those skilled in the art, it is to be distinctly understood that the principles of the invention are not to be limited to the exact construction shown and described, but that all suitable modifications may be employed falling within the scope of the appended claims.

What is claimed as new is:

1. A boring and facing head, including a block, a tool holder, a rotatable member carried by said block, a lead screw journaled diametrically of said block, a traveling member adjustably carried by said lead screw and connected to said tool holder, a first clutch plate including a sleeve carried by said lead screw and having a toothed clutch face, a second clutch plate slidably carried by said sleeve and having a toothed face engageable with the toothed face of said first clutch plate, a slidable member carried by said block, means connecting said slidable member to said second clutch plate, a cam track provided in said rotatable member for actuating said slidable member, and resilient means normally urging the toothed face of said first clutch plate into operative engagement with the toothed face of said second clutch plate.

2. The combination of claim 1 and means for rotating said first clutch plate.

3. A boring and facing head, including a block, a tool holder, a rotatable member carried by said block, a lead screw journaled diametrically of said block, a traveling member adjustably carried by said lead screw and connected to said tool holder, a first clutch plate including a sleeve carried by said lead screw and having a toothed clutch face, a second clutch plate slidably carried by said sleeve and having a toothed face engageable with the toothed face of said first clutch plate, a slidable member carried by said block, means connecting said slidable member to said second clutch plate, a cam track provided in said rotatable member for actuating said slidable member, a rotatable tool receiving member engaging said first clutch plate for rotating the latter, and a coil spring embracing said tool receiving member for urging said first clutch plate into engagement with said second clutch plate.

4. The combination of claim 3, a rotatable stop holder carried by said block, said stop holder having an externally threaded portion, a stop member receivably engaging the threaded portion of said stop holder, said stop member being engageable with said traveling member to limit the longitudinal movement of said traveling member in one direction, and means urging said stop holder in one direction.

5. The combination of claim 1 and a laterally projecting pin carried by said slidable member, and resilient means normally urging said pin into engagement with said cam track.

6. A boring and facing head, including a block, a tool holder, a rotatable member carried by said block, a lead screw journaled diametrically of said block, a traveling member adjustably carried by said lead screw and connected to said tool holder, a first clutch plate including a sleeve carried by said lead screw and having a toothed clutch face, a second clutch plate slidably carried by said sleeve and having a toothed face engageable with the toothed face of said first clutch plate, a slidable, non-rotatable actuating plunger carried by said block, a cam track provided in said rotatable member, means normally urging said actuating plunger into engagement with said cam track, a bifurcated portion carried by said second clutch plate, a laterally projecting pin carried by said plunger slidably and pivotally engaging said bifurcated portion, said plunger being selectively actuated upon a predetermined rotation of said rotatable member, and resilient means normally urging the toothed face of said first clutch plate into operative engagement with the toothed face of said second plate.

7. A boring and facing head, including a block, a tool holder, a rotatable member carried by said block, a lead screw journaled diametrically of said block, a traveling member adjustably carried by said lead screw and connected to said tool holder, a first clutch plate including a sleeve carried by said lead screw and having a toothed clutch face, a second clutch plate slidably carried by said sleeve and having a toothed face engageable with the toothed face of said first clutch plate, a slidable, non-rotatable actuating plunger carried by said block, a cam track provided in said rotatable member, means normally urging said actuating plunger into engagement with said cam track, a bifurcated portion carried by said second clutch plate, a laterally projecting pin carried by said plunger slidably and pivotally engaging said bifurcated portion, said plunger being selectively actuated upon a predetermined rotation of said rotatable member, a rotatable tool receiving member engaging said first clutch plate for rotating the latter, a coil spring embracing said tool receiving member for urging the toothed face of said first clutch plate into engagement with the toothed face of said second clutch plate, a rotatable stop holder carried by said block, said stop holder having an externally threaded portion, a stop member receivably engaging the threaded portion of said stop holder, said stop being engageable with said traveling member to limit the longitudinal movement of said traveling member in one direction, and means urging said stop holder in one direction.

HERMAN E. MYERS.

REFERENCES CITED

The following references are of record in the file of this patent:

UNITED STATES PATENTS

| Number | Name | Date |
|---|---|---|
| 2,079,197 | Bergman | May 4, 1937 |
| 2,209,867 | Wohlhaupter | July 30, 1940 |
| 2,461,732 | Hansen | Feb. 15, 1949 |